(12) United States Patent
Soatti et al.

(10) Patent No.: US 11,904,982 B2
(45) Date of Patent: Feb. 20, 2024

(54) METHOD FOR DETERMINING AN OPERATIVE SHIFT CONFIGURATION OF A DRIVE MECHANISM OF A GEARBOX OF A SADDLE-RIDE TYPE VEHICLE

(71) Applicant: Piaggio & C. S.p.A., Pontedera (IT)

(72) Inventors: Piero Soatti, Pontedera (IT); Stivi Peron, Pontedera (IT)

(73) Assignee: Piaggio & C. S.p.A., Pontedera (IT)

( * ) Notice: Subject to any disclaimer, the term of this patent is extended or adjusted under 35 U.S.C. 154(b) by 0 days.

(21) Appl. No.: 18/025,415

(22) PCT Filed: Sep. 9, 2021

(86) PCT No.: PCT/IB2021/058193
§ 371 (c)(1),
(2) Date: Mar. 9, 2023

(87) PCT Pub. No.: WO2022/053962
PCT Pub. Date: Mar. 17, 2022

(65) Prior Publication Data
US 2023/0331344 A1    Oct. 19, 2023

(30) Foreign Application Priority Data
Sep. 9, 2020   (IT) .................. 102020000021343

(51) Int. Cl.
*F16H 63/50*   (2006.01)
*B62M 25/06*   (2006.01)
*B62K 23/08*   (2006.01)

(52) U.S. Cl.
CPC ............. *B62M 25/06* (2013.01); *B62K 23/08* (2013.01); *F16H 63/50* (2013.01)

(58) Field of Classification Search
CPC .............................. B62M 25/06; F16H 63/502
See application file for complete search history.

(56) References Cited

U.S. PATENT DOCUMENTS 7,938,749 B2 *   5/2011   Watanabe ............. B60W 10/06
                                                477/109
9,157,510 B2 * 10/2015   Kojima .................. F16H 61/688
(Continued)

FOREIGN PATENT DOCUMENTS

EP    1923287    5/2008
EP    3343074    7/2018

*Primary Examiner* — Derek D Knight
(74) *Attorney, Agent, or Firm* — Patterson Intellectual Property Law, P.C.

(57) ABSTRACT

The present invention relates to a method for determining an operative shift configuration of a drive mechanism (1) of a gearbox (G) of a saddle-ride type vehicle (4). In particular, this method is applied to a drive mechanism (1) comprising a pedal shift lever (12) and a quick-shifter device (5) that connects, directly or indirectly, the lever to the gearbox, where this device includes a rod (10) and first sensor means (SM0, SM1-SM2) that detect the variation of the tension state of said rod (10) following a gear shifting. The method according to the invention includes acquiring a first signal (S1) generated by said first sensor means and determining, based on said first signal, whether the rod is in a traction tension state or in a compression tension state. The method also includes acquiring at least a second signal (S2) generated by second sensor means (SM3) and determining, based on this second signal (S2), the gear engaged following said gear shifting and/or the direction of said gear shifting. Finally, the method includes determining the operative shift configuration of the drive mechanism based on the tension state determined in the step B) and the gear engaged and/or based on the direction of said gear shifting determined in the step D).

18 Claims, 6 Drawing Sheets

(56) References Cited

U.S. PATENT DOCUMENTS 10,597,037 B2 *  3/2020  Nakagawa ............ B60W 50/14
10,900,567 B2 *  1/2021  Sugano ................... F16H 59/68

* cited by examiner

METHOD FOR DETERMINING AN OPERATIVE SHIFT CONFIGURATION OF A DRIVE MECHANISM OF A GEARBOX OF A SADDLE-RIDE TYPE VEHICLE

TECHNICAL FIELD

The present invention falls within the field of the production of saddle-ride type motorcycles provided with automatic gearbox operated by a mechanism comprising a quick-shifter device. More precisely, the present invention refers to a method, which can be implemented by a control unit of the motor vehicle, to determine the operative shift configuration of the drive mechanism of the gearbox between a first configuration and a second possible configuration.

BACKGROUND ART

In saddle-ride type vehicles engaging of the gear of the gearbox is controlled through a drive mechanism comprising a pedal lever on which the pilot acts with one foot. In accordance with a first installation configuration of this mechanism, defined "standard", the first gear is engaged through a downward rotation (typically counter-clockwise) of the pedal lever, while the second gear, and in general a higher gear "upshifting", is engaged through an upward rotation (typically clockwise), of the pedal lever. Downshifting takes place following a rotation (typically counter-clockwise) of the pedal lever.

Pilots of sports motorcycles find it useful to reverse the direction of shifting by varying the installation configuration of the drive mechanism so as to reverse the shifting direction, so that the "upshift" gears are engaged through a downward rotation (preferably counter-clockwise) of the pedal lever, while downshifting takes place with an upward rotation of the lever. The usefulness of this second possible installation configuration, called "reverse", is appreciated above all when the motor vehicle is used on the racetrack, precisely when the pilot requires to shift up the gear in a condition with the motor vehicle at a high lean angle. With a standard configuration of the installation mechanism, to upshift the gear, the pilot acts on the pedal lever using the back of the foot. This is positioned between the pedal lever and the road surface. However, in a condition with a high lean angle, the foot could impact against the road surface with dangerous consequences. This risk is eliminated when the mechanism is installed according to the "reverse" configuration, which allows the pilot to shift to a higher gear (or upshift) using the sole of the foot, i.e., maintaining the foot in a safe position above the pedal lever and shifting the lever downward.

The two installation configurations indicated are also respectively called "standard operative shift" configuration and "reverse operative shift" configuration.

In a motor vehicle provided with a conventional gearbox, i.e., in which gear shifting requires the pilot to disengage the clutch and close the throttle, the reverse operative shift configuration is obtained by modifying the configuration of the linkages of the drive mechanism and that connect, indirectly, the pedal lever with the selector drum of the gearbox. In practice, the change of configuration is produced through a simple mechanical modification of the drive mechanism. However, this modification is not sufficient to allow operation of the vehicle when it is provided with an electronic gearbox (also called automatic) which, as is known, minimizes the shifting time, making both upshifting and downshifting faster. In particular, this gearbox uses a drive mechanism of the gearbox provided with a device commonly known with the term "quick-shifter", which allows the gear to be engaged without closing the accelerator, disengaging the clutch and thus without removing the hands from the handlebar.

In detail, the quick-shifter consists of a rod interposed between the pedal lever and the selector drum of the gearbox. Typically, this rod is associated with at least a first microswitch (SM1) that generates a signal each time the lever of the gearbox is operated to increase the gear (upshifting). This signal is sent to a control unit that acts on the engine, shutting off the delivery of torque necessary for the time required to engage the higher gear. Frequently, the rod of the quick-shifter is associated with a second microswitch (SM2) that generates a corresponding signal when the lever of the gearbox is operated to decrease the gear (downshifting). In this case, following the signal generated by the second microswitch, the control unit opens the throttle valve providing torque to the engine. To generate the corresponding signals, the microswitches detect the traction or compression state of the rod with which they are associated. FIG. 1 illustrates a drive mechanism control of the gearbox provided with quick-shifter in which the rod 10 includes a first end 10A hinged (axis X1) to the end of a transmission lever 11 that rotates around a rotation axis X together with the pedal lever 12 on which the pilot acts. A second end 10B of the rod 10 is rotatably connected (around an axis C) to a first end of a connection lever 13. The second end of the connection lever 13 is connected, typically through a connection with splines, to the selector drum of the gearbox. The mechanism described defines a standard shift configuration so that to upshift the control lever 12 is rotated in clockwise direction (upward) around the rotation axis X causing a traction state on the rod 10. This state is detected by the first microswitch SM1 associated with the rod 10. On the contrary, during downshifting (counter-clockwise rotation of the pedal lever 12), the rod 10 is in a compression state detected by the second microswitch SM2.

With reference to FIG. 2, to obtain the reverse shift configuration, the connection lever 13 is disconnected from the selector drum, rotated by a predetermined angle and reconnected to the selector drum in a position with mirror-image symmetry (reversed) with respect to the position occupied in standard configuration, where this position is evaluated with respect to a reference plane passing through the axis X1 relating to the first end 10A and the rotation axis Y of the selector drum. Following this mechanical adjustment, the rod 10 is compressed each time the pedal lever 12 is pushed downward, i.e., each time upshifting is requested. On the contrary, during downshifting, the rod 10 is in a traction state.

In the case of an electronic gearbox, to allow correct operation of the engine the control unit must adapt the control strategy of the engine to the effective operative shift configuration (standard or reverse) of the drive mechanism so as to shut off the torque transmitted by the engine when the gear is effectively upshifted, or alternatively to transmit this torque in the case in which the gear is effectively downshifted. In other words, the control unit must correctly interpret the signals sent by the microswitches (SM1, SM2). If, in the case of a "reverse" configuration, the control unit were to consider the signals provided by the sensors SM1-SM2 in the same way as in the "standard" configuration, it would operate in a completely inappropriate way, shutting off the transmission of torque during downshifting or allowing this transmission during upshifting.

Therefore, there is the need to set operation of the control unit based on the effective operative shift configuration (standard or reverse) of the drive mechanism of the gearbox. In the current state of the art, correct setting of the control unit, and thus of any change of the control strategy, is substantially delegated to the pilot or to an operator responsible for preparing the motor vehicle. In practice, after the mechanical modification has been made, i.e., the change of configuration from standard to reverse, the pilot, or person delegated with this task, must remember to intervene on the control unit, in order to make it aware of the change of configuration and ultimately set the correct control strategy of the engine. This solution seems clearly risky, as it depends entirely on the human component.

SUMMARY

The main aim of the present invention is to provide a solution that allows the problem set forth above to be solved. Within this aim, a first object is to provide a method that can be implemented by a control unit of the motor vehicle, which allows at least two possible operative shift configurations (standard or reverse) of the drive mechanism to be determined, where this method does not rely on the human factor. Another object of the present invention is to provide a method that allows a control unit to determine the effective operative shift configuration (standard or reverse) of the gear shift mechanism and to set its operation autonomously. Another object of the present invention is to provide a method that is reliable and easily implemented at competitive costs.

The Applicant has found that the aim and the objects indicated above can be achieved by means of a method that determines the effective operative shift configuration of the drive mechanism of the gearbox, between at least two possible configurations, based on a first signal, acquired during or following a gear shifting, characteristic of the tension state or the compression state of the rod of the quick-shifter device and on a second signal useful to determine, directly or indirectly, the gear engaged or the direction of the gear shifting.

In particular, the Applicant has found that said aim and said objects can be achieved through a method for determining an operative shift configuration of a drive mechanism of a gearbox of a saddle-ride type vehicle, wherein this drive mechanism includes a pedal shift lever and a quick-shifter device that connects, directly or indirectly, the pedal lever to the gearbox, wherein the quick-shifter device includes a rod and first sensor means that detect the variation of the tension state or the compression state of the rod following a gear shifting. In particular, the method according to the invention includes the steps of:

A) acquiring a first signal generated by the first sensor means and indicative of the tension state or the compression state of the rod following said gear shifting;
B) determining, based on said first signal, whether said rod is in a tension state or in a compression state;
C) acquiring at least a second signal generated by second sensor means following a gear shifting by means of said pedal shift lever;
D) determining, based on said at least a second signal, the gear engaged following said gear shifting and/or the direction of said gear shifting;
E) determining an operative shift configuration of the drive mechanism of said gearbox selected from a standard operative shift configuration and a reverse operative shift configuration of said pedal shift lever, wherein said operative shift configuration is determined based on the tension state or the compression state determined in the step B) and the gear determined or the direction of said gear shifting determined in the step D).

Preferably, in the standard operative shift configuration of the pedal shift lever a first gear is engaged through a counter-clockwise rotation of the pedal lever, while a second and subsequent gears are engaged through a clockwise rotation of the pedal lever; instead, in the reverse operative shift configuration of the pedal shift lever a first gear is engaged through a clockwise rotation of the pedal lever, while a second and subsequent gears are engaged through a counter-clockwise rotation of the pedal lever.

In a first possible embodiment thereof, the first sensor means of said rod include a first sensor that detects a tension state and a second sensor that detects a compression state of the rod; in particular, the step B) includes the sub-steps of:
determining that said rod is in a tension state when said first signal is sent by the first sensor;
determining that said rod is in a compression state when said first signal is sent by the second sensor.

In an alternative embodiment thereof, the first sensor means include a sensor generating a signal that is indicative of the axial tension value to which said rod is subjected; in this case, a step B) includes the sub-steps of:
determining that the rod is in a tension state when said value of said signal generated by the sensor is included in a first range of values;
determining that the rod is in a compression state when the signal indicator is included in a second range of values.

In accordance with a first embodiment, the second sensor means detect the direction of rotation of the selector drum of the gearbox during a first gear shifting starting from a neutral condition, and said step D) includes the sub-steps of:
determining that a first gear is engaged when said rotation of said selector drum is in a first direction and
determining that a second gear is engaged when said rotation of said selector drum is in a second direction opposite to said first direction.

Again with reference to this embodiment, preferably in said step E) said standard operative shift configuration is determined:
when in said step B) said tension state is determined and in said step D) said first gear engaged is determined, or
when in said step B) said compression state is determined and in said step D) said second gear engaged is determined, and
and said reverse operative shift configuration is determined:
when in said step B) said compression state is determined and in said step D) said first gear engaged is determined, or
when in said step B) said tension state is determined and in said step D) said second gear engaged is determined.

In accordance with an alternative embodiment of the method according to the invention, said step D) includes the sub-steps of:
d1) acquiring a second signal indicative of the speed of said vehicle;
d2) acquiring a third signal indicative of the speed of the engine of the vehicle,
d3) acquiring a fourth signal indicative of the neutral condition of said gearbox;
d4) acquiring a fifth signal indicative of the condition of the clutch of the vehicle;

d5) determining, based on the fourth signal whether said gearbox is in a neutral condition or not in a neutral condition;

d6) determining, based on said fifth signal, whether the clutch is in an engaged condition or in a disengaged condition, wherein when in said sub-step d5) it is determined that said gearbox is not in a neutral condition and in said sub-step d6) it is determined that said clutch is in a disengaged condition, said step D) includes the further sub-steps di:

d7) calculating a reference parameter M based on the relationship:

$$M=K*(V/rpm)$$

wherein:

K is a constant depending on the vehicle transmission;

V is the speed of the vehicle;

rpm is the number of revolutions of the drive shaft of the engine of said vehicle;

d8) defining a series of reference intervals for said parameter (M), wherein each reference interval is indicative of a gear engaged;

d9) determining said gear engaged based on the reference interval into which said parameter (M) falls;

d10) determining the direction of said gear shifting based on the comparison between said gear engaged determined in the step d9) and the gear engaged before said gear shifting.

Preferably, in this second embodiment, in said step E) said standard operative shift configuration is determined when:

in said step B) a tension state is determined and in said step D) an upshifting direction is determined; or when:

in said step B) a compression state is determined and in said step D) a downshifting is determined, and said second reverse operative shift configuration is determined when:

in said step B) a tension state is determined and in said step D) a downshifting direction is determined; or alternatively:

in the step B) a compression state is determined and in said step D) an upshifting direction is determined.

The present invention also relates to a method of control of a saddle-ride type vehicle comprising an engine, a gearbox operated by means of a drive mechanism that comprises a lever shift pedal and a quick-shifter device that connects, directly or indirectly, said lever pedal to said gearbox, wherein said method comprises the steps of:

T1) determining the operative shift configuration of said drive mechanism by a method according to the invention;

T2) controlling said motor based on the configuration of said drive mechanism determined in the step T1).

In a possible embodiment thereof, the method of control also includes the steps of:

U1) memorizing, before the shutdown of said engine, the operative shift configuration of said drive mechanism determined by a method according to the present invention;

U2) controlling said engine, after its restart, on the basis of the operative shift configuration memorized in the step U1;

U3) redetermining the operative shift configuration of said drive mechanism (1) by a method according to the present invention;

U4) determining whether the operative shift configuration of said drive mechanism memorized in the step U1) corresponds to the one redetermined in the step U3);

U5) changing, in case of mismatch between the operative shift configuration redetermined in the step U3) and the operative shift configuration memorized in the step U1), the control strategy of said engine on the basis of said operative shift configuration redetermined in the step U3).

Preferably, said method includes the further step U6) of providing a signal indicative of the mismatch between the operative shift configuration determined in the step U3) and the operative shift configuration memorized in the step U1).

LIST OF FIGURES

Further features and advantages of the invention will be more evident from examination of the following detailed description of some preferred, but not exclusive, embodiments of the method according to the invention, illustrated by way of non-limiting example with the aid of the accompanying drawings, wherein.

The same reference numbers and letters in the figures identify the same elements or components.

DETAILED DESCRIPTION

Figure 1:
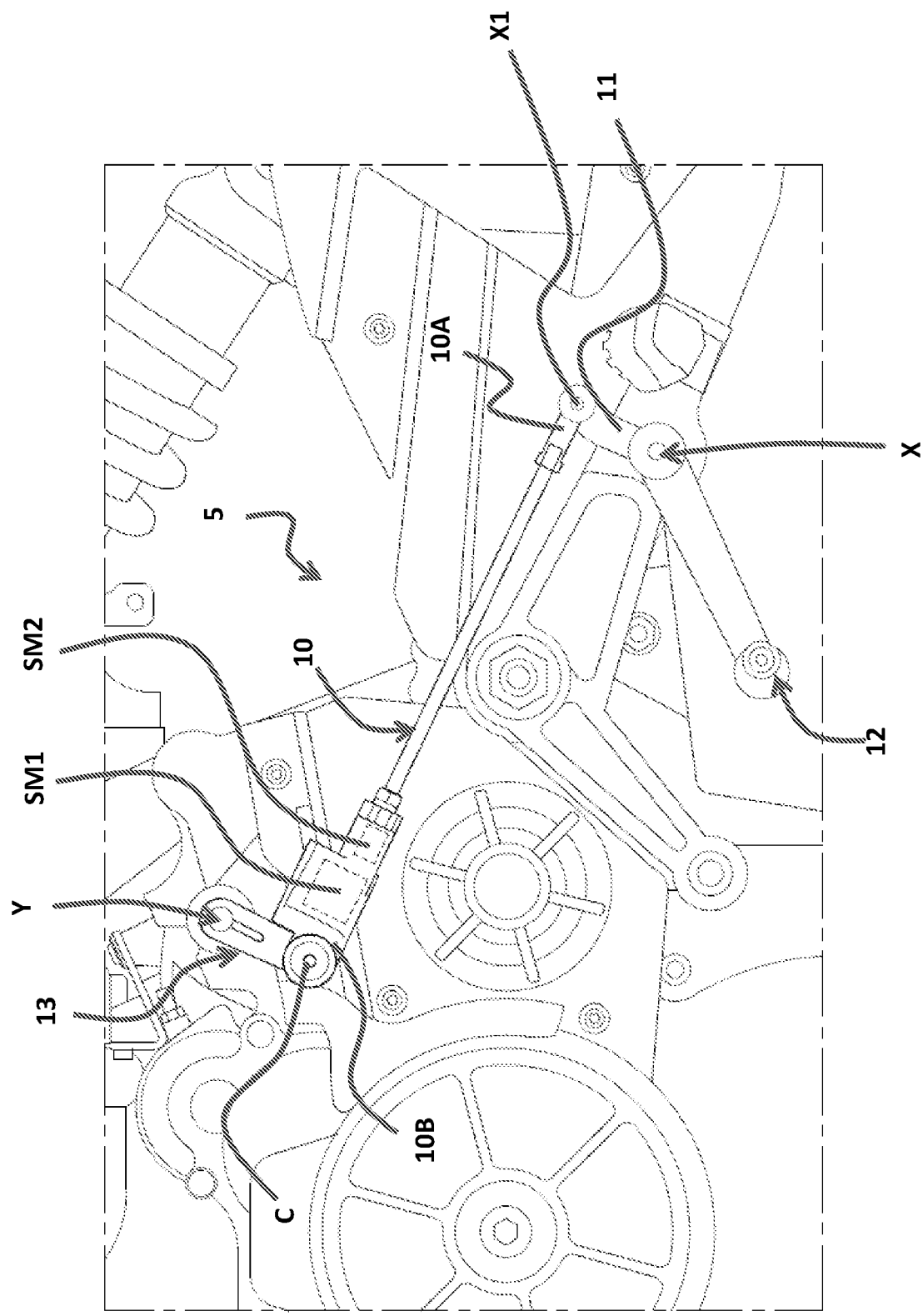
FIG. 1 is a schematic view of a first operative shift configuration of a drive mechanism of known type of a gearbox of a saddle-ride type vehicle of known type according to the present invention.

The present invention relates to a method for determining the operative shift configuration of a drive mechanism of a gearbox of a saddle-ride type vehicle provided with quick-shifter device. The expression operative shift configuration in substance indicates the installation configuration of the mechanism. In particular, the method according to the invention has the purpose of determining the configuration between a "standard" and a "reverse" configuration as defined above.

In particular, in a standard operative shift configuration a first gear is engaged through a counter-clockwise rotation of the pedal lever, while a second and subsequent gears are engaged through a clockwise rotation of the pedal lever.

Instead, in a reverse operative shift configuration a first gear is engaged through a clockwise rotation of the pedal lever, while a second and subsequent gears are engaged through a counter-clockwise rotation of the pedal lever.

For the purposes of the present invention, the expression "saddle-ride type vehicle" is meant generically as any two-wheeled moped or motorcycle provided with a front wheel and a rear wheel. In general, according to a widely known principle, the vehicle 4 comprises an engine E connected to a gearbox G through a clutch F and a mechanical transmission that connects the output of the gearbox G to a driving wheel W (see the diagrams in FIGS. 4 and 5). Hereinafter in the description, the vehicle 4 will also be indicated with the term motor vehicle 4 or motorcycle 4.

In particular, the method according to the invention can be used to determine the operative shift configuration of a drive mechanism 1 comprising a pedal shift lever 12, that can be operated by the pilot and connected, directly or indirectly, to the gearbox G through a quick-shifter device 5, the operation and operating principle of which are widely known to those skilled in the art. The quick-shifter device 5 includes a rod 10 and first sensor means SM0, SM1-SM2 that detect the variation of the tension state or the compression state of the rod 10 following a gear shifting controlled by the pilot of the motorcycle 1 through the pedal lever 12.

The method according to the invention includes the steps of:
A) acquiring a first signal S0, S1, generated by first sensor means S0, SM1, SM2, and indicative of the tension state or the compression state determined in the rod 10 of the quick-shifter mechanism 5 following said gear shifting requested by the pilot;
B) determining, based on the first signal S0, S1, whether the rod 10 of the quick-shifter mechanism 5 is in a tension state or in a compression state;
C) acquiring at least a second signal S2 generated by second sensor means SM3;
D) determining, based on said at least a second signal S2, the gear engaged following said gear shifting and/or the direction of said gear shifting;
E) determining the operative shift configuration of the drive mechanism 1 of the gearbox G based on the tension state or the compression state determined in the step B) and the gear and/or the direction of said gear shifting determined in the step D).

The method according to the invention thus includes determining the operative shift configuration combining the information relating to the tension state or the compression state of the rod 10 of the quick-shifter with the information relating to the gear engaged or to the direction of the gear shifting. As will be apparent from the description below, both sets of information can be advantageously acquired through devices that are already present on the motor vehicle 1, such as the sensors belonging to the quick-shifter device.

For the purposes of the present invention, the expression "following a gear shifting" and/or the expression "following shifting" means both the transition (upshift or downshift) from a gear engaged to a different gear engaged, and the conditions between a condition of the gearbox in neutral (no gear engaged) to a condition of the gearbox not in neutral (i.e. having a gear engaged). The expression "direction of gear shifting" or "direction of shifting" means the direction of the transition, upshift or downshift, relating to the gear shifting.

The method according to the invention is preferably implemented by the control unit 100 provided for controlling operation of the engine of the motor vehicle 4 (i.e. engine start/shutdown) according to known principles, indicated above. With reference to the schematization of FIG. 3, in accordance with a first embodiment, the control unit 100 is electrically connected to a first sensor SM1 and to a second sensor SM2 (as a whole defining the first sensor means) associated with the rod 10 of the quick-shifter device 5. The first sensor SM1 detects any traction state of the rod 10, while the second sensor SM2 detects any compression state thereof. Preferably, the two sensors SM1, SM2 are configured as two microswitches, so that if the first microswitch (first sensor SM1) generates a signal indicative of a traction state of the rod 10, then the second microswitch (second sensor SM2) does not generate any signal, and vice versa.

In accordance with the step A) indicated above, the signal sent by the two sensors SM1, SM2 is acquired by the control unit 100 which, preferably, determines the tension state or compression state on the basis of the sensor SM1, SM2 that sends the signal to the control unit 100. Therefore, in the step B) indicated above, the control unit 100 determines that the rod 10 is in a traction state when the first signal S1 is sent by the first sensor SM1, while it determines that the rod 10 is in a compression state when the first signal S1 is sent by the second sensor SM2.

Figure 4:
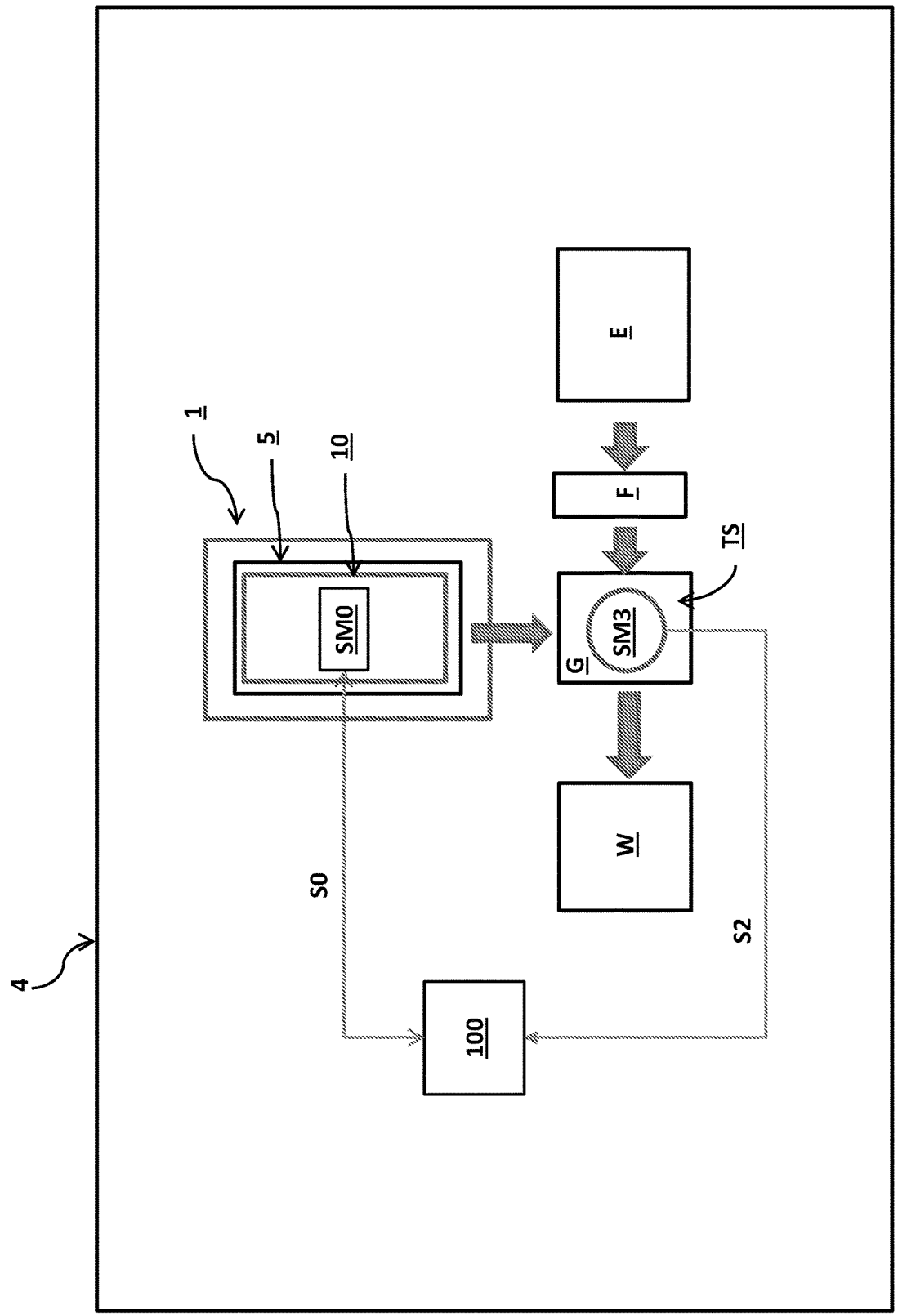

In accordance with an alternative embodiment schematized in FIG. 4, the first sensor means include a single sensor (indicated with SM0) associated with the rod 10 and configured to generate a single signal (indicated with S0) characteristic of the axial tension to which the rod is subjected. In this embodiment, the control unit 100 determines the tension state or compression state of the rod 10 based on the value of this signal S0 generated by the single sensor SM0.

Figure 6:
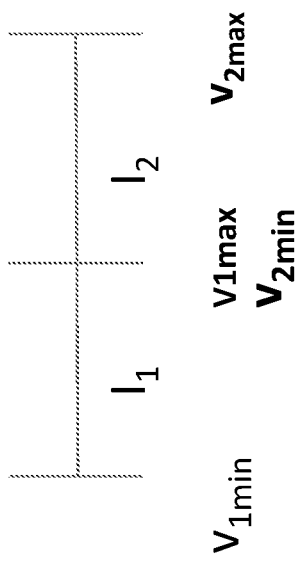
FIGS. 6 and 7 are further explanatory diagrams of steps of the method according to the invention respectively in the embodiments of FIG. 4 and FIG. 5.

With reference to the diagram of FIG. 6, specifically the control unit 100 determines that the rod is in a compression state when the value of said signal S0 generated by the sensor SM0 falls within a first range of values $I_1$, and determines that the rod is in a tension state when the value of said signal S0 falls within a second range of values $I_2$.

Each range $I_1$, $I_2$ of values is defined between a minimum value $V_{1min}$, $V_{2min}$ and a maximum value $V_{1max}$, $V_{2max}$. Preferably, the two ranges $I_1$, $I_2$ are consecutive so that the maximum value of the first range $I_1$ coincides with the minimum value of the second range $I_2$ (condition $V_{1max}=V_{2min}$).

Figure 3:
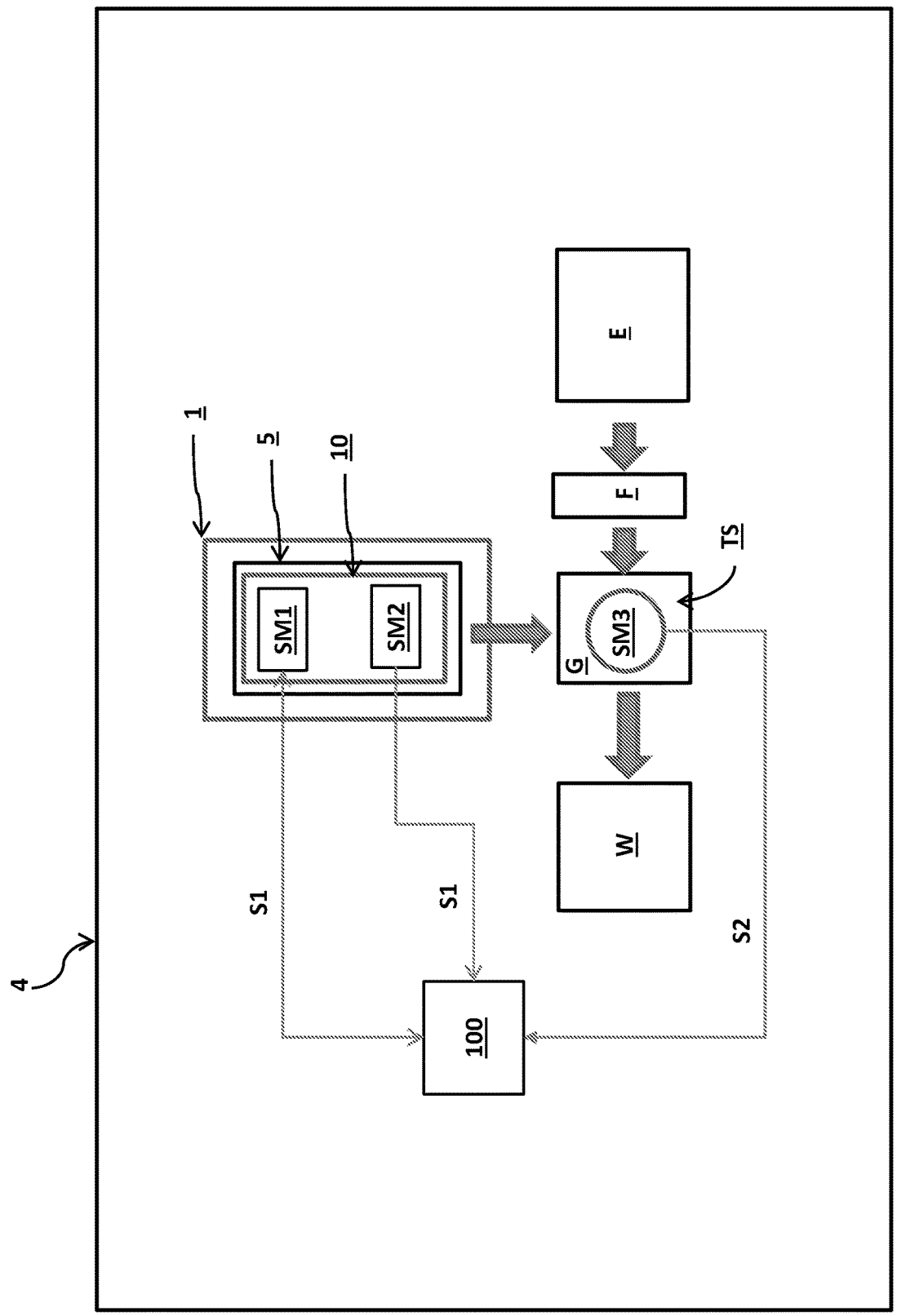
FIGS. 3, 4 and 5 are diagrams relating respectively to a first, a second and a third possible embodiment of a method according to the invention.

Therefore, with respect to the embodiment of FIG. 3, in this case determination of the tension state or the compression state of the rod 10 takes place through a single sensor SM0. Advantageously, the value of the signal S0 can be exploited by the control unit 100 also to optimize control of the engine E. In fact, while driving, determining the gear shifting on the basis of the value of the tension, the control unit 100 could be adjusted so as to anticipate or delay the intervention on the engine.

In accordance with an embodiment of the invention, in the step B) the second sensor means SM3 are configured to detect a signal indicative of the direction of rotation (clockwise or counter-clockwise) of the selector drum TS of the gearbox G to which the drive mechanism 1 is connected (see FIGS. 3 and 4). The rotation of the selector drum TS is evidently determined following the action of the pilot on the pedal lever 12 of the drive mechanism 1.

Figure 2:
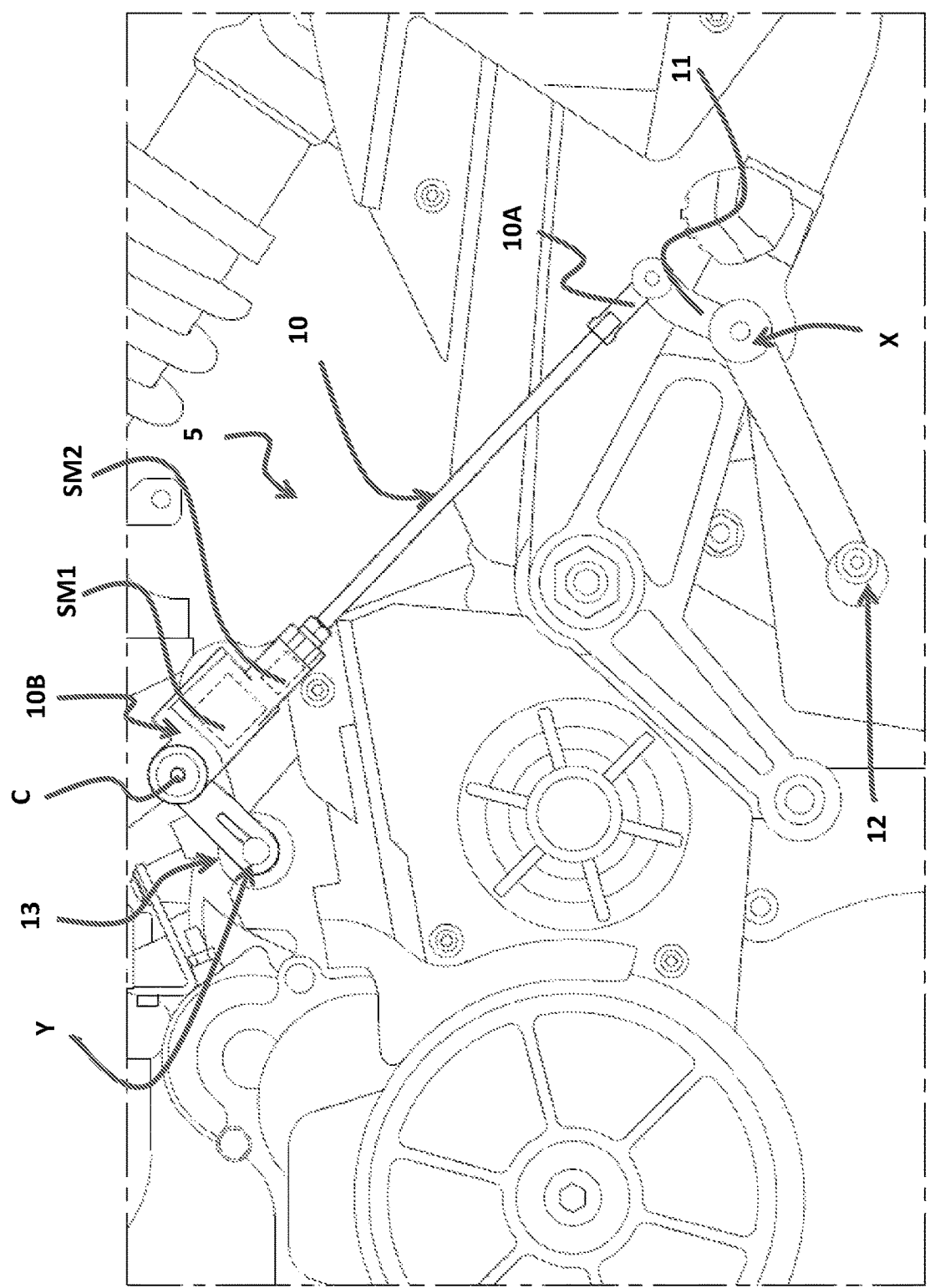
FIG. 2 is a schematic view of a second operative shift configuration of a drive mechanism of known type of a gearbox of a saddle-ride type vehicle.

The second sensor means SM3 detect the rotation of the selector drum TS of the gearbox G starting from a neutral condition of the gearbox. Therefore, the second signal S2 is advantageously acquired following the "first shifting", i.e., following the first gear shifting. The direction of rotation of the selector drum TS depends on the operative shift configuration of the drive mechanism 1, as is evident by comparing FIGS. 1 and 2. In fact, the direction of rotation of the selector drum TS corresponds to that of the connection lever 13 of the drive mechanism 1. To detect the rotation of the selector drum TS, the second sensor means SM3 can comprise, for example, an encoder sensor or another functionally equivalent sensor.

In this embodiment, schematized in FIGS. 3 and 4, in accordance with the step D) of the method according to the invention, the control unit 100 establishes that a first gear has been engaged when the rotation detected of the selector drum TS is in a first direction (for example clockwise) and establishes that a second gear (different from the first) has been engaged when the rotation of the selector drum is in a second direction, opposite to the first direction (hence counter-clockwise, to continue the example). In substance, each direction of rotation is indicative of the engagement of a gear.

In this regard, the expressions "first gear" and "second gear" are meant to generically indicate two gears the engagement of which requires opposite directions of rotation of the selector drum TS, without these definitions intending to attribute a reference number to the gears effectively engaged of the gearbox G.

In this embodiment of the method according to the invention, based on the previous determinations on the tension state or the compression state of the rod 10 and on the gear engaged, the control unit 100 determines whether the drive mechanism 1 of the gearbox G has been installed in accordance with a first operative shift configuration, corresponding to the standard configuration defined above, or in accordance with a second operative shift configuration, corresponding to the reverse configuration, also defined above. In particular, the control unit 100 determines that the drive mechanism 1 of the gearbox G is in the first configuration (standard) when:
 in the step B) a tension state is determined and in said step D) engagement of said second gear is determined (counter-clockwise rotation of the selector drum TS); or when:
 in the step B) a compression state is determined and in said step D) engagement of said first gear is determined (clockwise rotation of the selector drum TS).

The control unit 100 instead determines that the drive mechanism 1 of the gearbox G is in the second configuration (reverse) when one of the two following combinations occurs:
 in the step B) a tension state is determined and in said step D) engagement of said first gear is determined (clockwise rotation of the selector drum); or alternatively
 in the step B) a compression state is determined and in said step D) engagement of said second gear is determined (counter-clockwise rotation of the selector drum TS).

Based on the above, in this embodiment, to determine the effective operative shift configuration of the drive mechanism 1, the control unit 100 combines the information on the tension state or the compression state of the rod (provided by the first sensor means SM0, SM1-SM2 associated with the rod 10) with the information relating to the direction of rotation of the selector drum SL (provided by the second sensor means SM3), which is strictly dependent on said operative shift configuration. Advantageously, both sets of information are provided, at least in part, by sensors that can be SM1-SM2, SM3, which are typically already present in a motor vehicle with an automatic gearbox.

Figure 5:
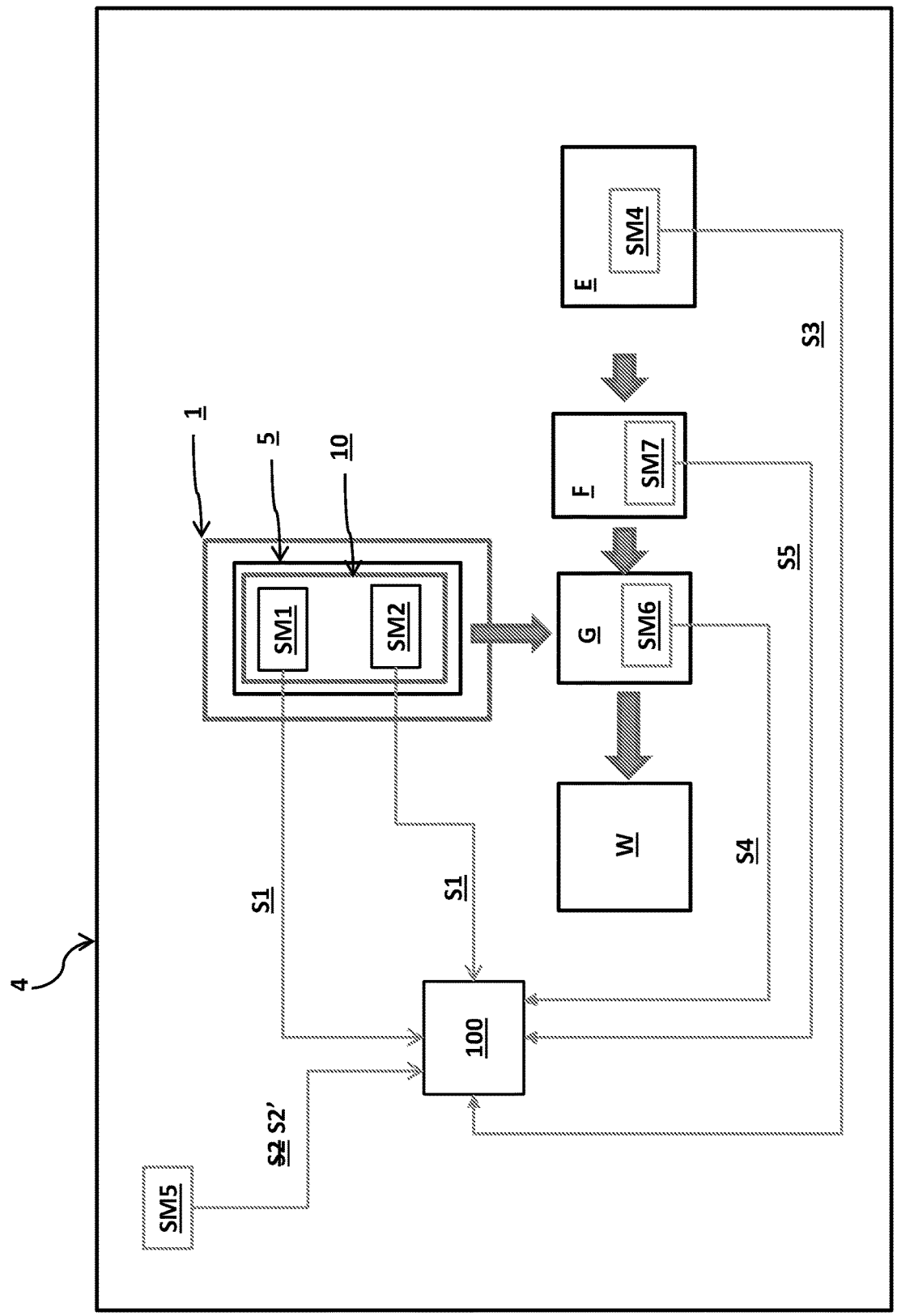

In a possible alternative embodiment, schematized in FIG. 5, in the step D) the direction of shifting is established based on a plurality of signals S2, S3, S4, S5 generated by related sensor means SM5, SM4, SM6, SM7 and acquired by the control unit 100. Specifically, the direction of shifting is established based on a calculation carried out by the control unit 100, where said calculation is based on the relationship between the speed of the vehicle 4 and the number of revolutions of the engine E.

More precisely, in this alternative embodiment, the step D) includes the sub-steps of:
 d1) acquiring a second signal S2' indicative of the speed of the vehicle 4;
 d2) acquiring a third signal S3 indicative of the speed of the engine E;
 d3) acquiring a fourth signal S4 indicative of the neutral condition of the gearbox G;
 d4) acquiring a fifth signal S5 indicative of the condition of the clutch F;
 d5) determining, based on said fourth signal S4, whether the gearbox G is in a neutral condition or a condition with the gear engaged;
 d6) determining, based on said fifth signal S5, whether the clutch F is in an engaged condition or in a disengaged condition;
 wherein when in the sub-step d5) it is determined that the gearbox G is not in a neutral condition and in the sub-step d6) it is determined that the clutch is in a disengaged condition, then the step D) includes the further sub-steps of:
 d7) calculating a reference parameter (M) based on the relationship:

$$M = K*(V/rpm)$$

wherein:
K is a constant depending on the vehicle transmission 4;
V is the speed of the vehicle;
rpm is the number of revolutions of the drive shaft of the engine E of said vehicle 4;
 d8) defining a series of reference intervals $I_{rif1}$-$I_{rif2}$ ... $I_{rifn}$ for the parameter M, wherein each reference interval $I_{rif1}$-$I_{rif2}$ ... $I_{rifn}$ is indicative of a gear engaged $m_1$-$m_n$;
 d9) determining said gear engaged $m_1$-$m_n$ based on the reference interval $I_{rif1}$-$I_{rif2}$ ... $I_{rifn}$ into which said parameter M falls;
 d10) determining the direction of said gear shifting (upshifting or downshifting) based on the comparison between the gear determined in the step d9) and the gear engaged before said gear shifting.

Differently from the first embodiment in which the information relating to the rotation of the selector drum TS is exploited, in this case determination of the operative shift configuration of the drive mechanism requires the vehicle to be moving, i.e., for it not to start from a neutral condition. Therefore, this determination takes place following a gear shifting subsequent to the first.

In accordance with the sub-steps d5) and d6) indicated above, the "moving" condition of the vehicle 4 is determined based on signals sent by appropriate sensor means MS7 that detect the condition of the clutch (disengaged or engaged) and other sensor means MS6 that instead detect any neutral condition of the gearbox. Advantageously, also these sensors MS7, MS6 are normally present on motor vehicles equipped with automatic gearbox or are in any case easily installable.

As indicated above, in this embodiment, the gear engaged $m_1$-$m_n$ is determined only in the case in which the gearbox G is not in a neutral condition and in the case in which the clutch F is effectively engaged (i.e., is not in a disengaged condition). In accordance with the sub-step d7), the method is based on calculating the parameter M expressed as product between a constant K and the relationship between the speed V of the vehicle and the number of revolutions rpm of the engine.

The constant K depends on the transmission of the vehicle 1 and can be expressed, for example, as the product between the ratio between primary and secondary transmission and the final ratio between pinion and ring gear. The values of speed V and number of revolutions (rpm) represent information available to the control unit 100 as they can be detected easily through appropriate sensor means MS5 and MS4.

Figure 7:
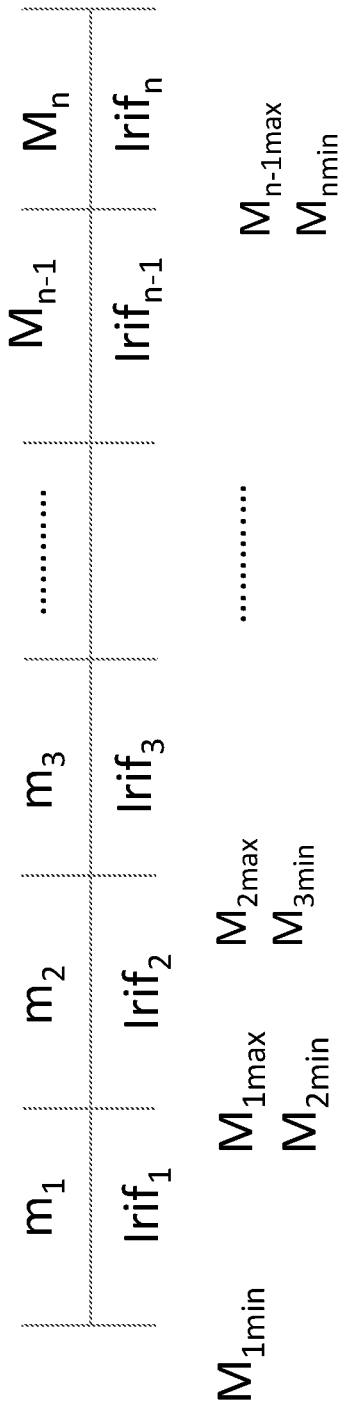

In accordance with the sub-step d9), the control unit 100 determines the gear engaged $m_1$-$m_n$ comparing the value of the parameter M, calculated in the sub-step d7), with a series of predefined intervals $I_{rif1}$-$I_{rif2}$ ... $I_{rifn}$ wherein each of these is indicative of a gear engaged (sub-step d8)). With reference to the diagram of FIG. 7, each interval $I_{rif1}$-$I_{rif2}$ ... -$I_{rifn}$ is defined between a maximum value and a minimum value, wherein the maximum value $M_{n-max}$ of an interval $I_{rifn}$ coincides with the minimum value M of the following interval $I_{rifn+1}$. The control unit 100 establishes that the gear $m_1$-$m_n$ engaged corresponds to the one of the reference interval $I_{rif}$ into which the value of the parameter M calculated in accordance with the step d7) falls. Again with reference to FIG. 7, if, for example, M falls into the second reference interval $I_{rif2}$ established between the values $M_{2min}$ and $M_{2max}$ then the control unit 10 determines that the gear engaged is the second, indicated with $m_2$.

In accordance with the step d10), based on comparison between the gear determined with the step d9) (i.e., the one determined following said gear shifting) and the gear engaged before the gear shifting, the control unit 100 determines the direction of the gear shifting (or direction of shifting), i.e., determines whether shifting is an upshift or downshift.

In accordance with the step E) of the method according to the invention, the control unit 100 combines the information relating to the direction of the gear shifting, established with the sub-steps d7)-d10), with the information (traction or compression state) provided by the first sensor means SM0, SM1, SM2 associated with the rod 10 of the quick-shifter device 5 determining whether this combination is indicative of the standard or alternatively the reverse operative shift configuration.

In particular, the control unit 100 determines that the drive mechanism 1 of the gearbox G is in the first operative shift configuration (standard) when:
  in the step B) a tension state is determined and in said step D) an upshifting direction is determined; or when:
  in the step B) a compression state is determined and in said step D) a downshifting direction is determined.

The control unit 100 instead determines that the drive mechanism 1 of the gearbox G is in the second operative shift configuration (reverse) when one of the following two combinations occur:
  in the step B) a tension state is determined and in said step D) a downshifting direction is determined; or alternatively:
  in the step B) a compression state is determined and in said step D) an upshifting direction is determined.

As already indicated above, in this embodiment, the control unit 100 thus combines the information on the direction of shifting (based on determination of the gear engaged) with the information relating to the tension state or the compression state of the rod 10 (provided by the first sensor means SM0, SM1-SM2) generated following shifting. It is specified that the first sensor means can be both of the type illustrated in FIG. 5 (i.e., comprising two sensors SM1-SM2) and of the type shown in FIG. 4 (i.e., with a single sensor SM0 generator of the signal S0 that indicates the value of the axial tension of the rod 10).

Again with reference to this second embodiment of the method, preferably the step e) is implemented after the sequence of sub-steps d7)-d10) has been repeated at least twice. This is in order to establish with greater certainty the effective gear engaged, above all in the case in which the values of the parameter M are close to a limit value (upper $M_{n-max}$ or lower $M_{n+1-min}$) of a predefined range of an interval L A. The present invention also relates to a method of control of a saddle-ride type vehicle comprising an engine E, a gearbox G operated by means of a drive mechanism 1 that includes a pedal shift lever 12 and a quick-shifter device 5 that connects, directly or indirectly, said pedal lever 12 to the gearbox G, wherein this method comprises the steps of:
  T1) determining the operative shift configuration of the drive mechanism 1 by the method according to the present invention;
  T2) controlling the engine E based on the configuration of the drive mechanism 1 determined in the step T1).

Advantageously, the control unit 100, after having implemented one of the two embodiments of the method to determine the operative shift configuration described above (in one of the embodiments described or in any other functionally equivalent embodiment and hence falling within the scope of the present invention), controls the engine E of the vehicle 4 based on the operative shift configuration (standard or reverse) of the drive mechanism 1 determined. In other words, by knowing the operative shift configuration effectively adopted, the control unit can correctly interpret the signals that are provided by the first sensor means MS0, MS1-MS2 associated with the rod 10 of the quick-shifter device 5. In this way, the control unit 10 is able to act correctly on the engine E and hence on the transmission of torque generated thereby. In accordance with a possible embodiment, the method of control of a vehicle according to the invention also includes the steps of:
  U1) memorizing, before the shutdown of the engine E, the operative shift configuration of the gearbox G determined by the method for determining the operative shift configuration according to the present invention;
  U2) controlling the engine E, after its restart, on the basis of the operative shift configuration of said drive mechanism memorized in the step U1;
  U3) redetermining the operative shift configuration of said drive mechanism 1 of the gearbox G by the method for determining the operative shift configuration according to the present invention;
  U4) determining whether the operative shift configuration of the drive mechanism 1 of the gearbox G memorized in the step U1) corresponds to the one redetermined in the step U3);
  U5) changing, in the case of mismatch between the operative shift configuration redetermined in the step U3) and the operative shift configuration memorized in the step U1), the control strategy of the engine E on the basis of the operative shift configuration redetermined in the step U3).

The sequence of steps U1-U5 can be implemented regardless of the mode with which the method according to the invention to determine the operative shift configuration of the drive mechanism is implemented. However, it can be applied more widely when this determination is based on determination of the direction of shifting based on calculation of the parameter M. In substance, the step U1) comprises memorizing the operative shift configuration of the drive mechanism before the shutdown of the engine E to then use this configuration to control the engine E in order to once again redetermine the effective operative shift configuration (step U3)) by the method of determination described above. If this reconfirms the previous operative shift configuration, the control unit 100 maintains the same operating mode on the engine E adopted before the shutdown. Otherwise, i.e., when the mode of shifting has effectively changed, then the control unit 100 adapts its operating mode so as to match the effective operative shift configuration.

In accordance with a possible embodiment, the method of control of the engine E includes the further step U6) of providing a signal indicative of the mismatch between the configuration determined in the step U3) and the configuration memorized in the step U1). The purpose of this signal is to notify the pilot of the change made to the drive mechanism of the gearbox G, i.e., the different shifting mode adopted.

The method according to the invention allows the aims and the objects to be fully achieved. In particular, the method allows the control unit to determine the operative shift configuration of the drive mechanism exploiting signals provided by sensors normally present on, or easily applicable to, motor vehicles provided with automatic gearbox based on the use of a quick-shifter device.

The invention claimed is:

1. A method for determining an operative shift configuration of a drive mechanism of a gearbox of a saddle-ride type vehicle, wherein the drive mechanism includes a pedal shift lever and a quick-shifter device that couples the pedal shift lever to the gearbox, wherein the quick-shifter device includes a rod and a first set of one or more sensors configured to detect a variation of a tension state or a compression state of the rod following a gear shifting, the method comprising:
   A) acquiring a first signal generated by the first set of one or more sensors and indicative of the tension state or the compression state of the rod determined following the gear shifting;
   B) determining, based on the first signal, whether the rod is in a tension state or in a compression state;
   C) acquiring at least a second signal generated by a second set of one or more sensors following the gear shifting via the pedal shift lever;
   D) determining, based on the at least a second signal, a gear engaged following the gear shifting and/or a direction of the gear shifting;
   E) determining the operative shift configuration of the drive mechanism of the gearbox selected from a standard operative shift configuration and a reverse operative shift configuration of the pedal shift lever, wherein the operative shift configuration is determined based on the tension state or the compression state as determined in step B) and the gear engaged and/or the direction of the gear shifting determined in step D).

2. The method of claim 1, wherein in the operative shift configuration of the pedal shift lever a first gear is engaged through a counter-clockwise rotation of the pedal lever, while a second and subsequent gears are engaged through a clockwise rotation of the pedal lever, and wherein in the reverse operative shift configuration of the pedal shift lever the first gear is engaged through the clockwise rotation of the pedal lever, while the second and subsequent gears are engaged through the counter-clockwise rotation of the pedal lever.

3. The method of claim 1, wherein:
   the first set of one or more sensors comprises a first sensor configured to detect a tension state and a second sensor configured to detect a compression state of the rod; and
   step B) further comprises:
      determining that the rod is in a tension state when the first signal is sent by the first sensor; and
      determining that the rod is in a compression state when the first signal is sent by the second sensor.

4. The method of claim 1, wherein:
   the first set of one or more sensors comprises a sensor configured to generate a signal indicative of an axial tension value to which the rod is subjected; and
   step B) further comprises:
      determining that the rod is in the tension state when the value of the signal generated by the sensor is included in a first range of values; and
      determining that the rod is in the compression state when the value of the signal generated by the sensor is included in a second range of values.

5. The method of claim 1, wherein:
   the second set of one or more sensors detect a direction of rotation of a selector drum of the gearbox during a first gear shifting starting from a neutral condition; and
   step D) further comprises:
      determining that a first gear is engaged when the rotation of the selector drum is in a first direction and
      determining that a second gear is engaged when the rotation of the selector drum is in a second direction opposite to the first direction.

6. The method of claim 5, wherein:
   in step E) the standard operative shift configuration is determined:
      when in step B) the tension state is determined and in step D) the first gear engaged is determined; or
      when in step B) the compression state is determined and in step D) the second gear engaged is determined;
   and wherein the reverse operative shift configuration is determined:
      when in step B) the compression state is determined and in step D) the first gear engaged is determined; or
      when in step B) the tension state is determined and in step D) the second gear engaged is determined.

7. The method of claim 1, wherein step D) further comprises:
   d1) acquiring the second signal indicative of a speed of the vehicle;
   d2) acquiring a third signal indicative of a speed of an engine of the vehicle;
   d3) acquiring a fourth signal indicative of a neutral condition of the gearbox;
   d4) acquiring a fifth signal indicative of a condition of a clutch of the vehicle;
   d5) determining, based on the fourth signal, whether the gearbox is in the neutral condition or not in the neutral condition;
   d6) determining, based on the fifth signal, whether the clutch is in an engaged condition or in a disengaged condition,
   wherein, when in sub-step d5) it is determined that the gearbox is not in the neutral condition and in the sub-step d6) it is determined that the clutch is in the disengaged condition, then step D) further comprises:
   d7) calculating a reference parameter based on:

$$M = K^*(V/rpm)$$

wherein:
      M is the reference parameter;
      K is a constant depending on a vehicle transmission;
      V is the speed of the vehicle;
      rpm is a number of revolutions of a drive shaft of the engine of the vehicle;

d8) defining a series of reference intervals for the parameter, wherein each reference interval is indicative of a gear engaged;
d9) determining the gear engaged based on the reference interval into which the parameter falls; and
d10) determining a direction of the gear shifting based on a comparison between the gear engaged determined in the sub-step d9) and the gear engaged before the gear shifting.

8. The method of claim 7, wherein:
in step E) the standard operative shift configuration is determined when:
  in step B) a tension state is determined and in step D) an upshifting direction is determined; or
  in step B) a compression state is determined and in step D) a downshifting direction is determined;
and wherein the reverse operative shift configuration is determined when:
  in step B) a tension state is determined and in step D) a downshifting direction is determined; or
  in step B) a compression state is determined and in step D) an upshifting direction is determined.

9. A method of control of a saddle-ride type vehicle comprising an engine, a gearbox operated using a drive mechanism that comprises a lever shift pedal and a quick-shifter device that couples the lever to the gearbox, the method comprising:
determining an operative shift configuration of the drive mechanism by:
  A) acquiring a first signal generated by a first set of one or more sensors and indicative of a tension state or a compression state of a rod determined following a gear shifting;
  B) determining, based on the first signal, whether the rod is in the tension state or in the compression state;
  C) acquiring at least a second signal generated by a second set of one or more sensors following the gear shifting via the pedal shift lever;
  D) determining, based on the at least a second signal, a gear engaged following the gear shifting and/or a direction of the gear shifting; and
  E) determining the operative shift configuration of the drive mechanism of the gearbox selected from a standard operative shift configuration and a reverse operative shift configuration of the pedal shift lever, wherein the operative shift configuration is determined based on the tension state or the compression state as determined in step B) and the gear engaged and/or the direction of the gear shifting determined in step D); and
controlling the engine based on the determined operative shift configuration of the drive mechanism.

10. The method of claim 9, further comprising:
storing, before a shutdown of the engine, a first operative shift configuration of the drive mechanism determined via steps A) to E);
controlling the engine upon restart based on the stored first operative shift configuration of the drive mechanism;
determining a second operative shift configuration of the drive mechanism via steps A) to E);
determining whether the first operative shift configuration of the drive mechanism corresponds to the second operative shift configuration of the drive mechanism;
in case of a mismatch between the first operative shift configuration and the second operative shift configuration, changing a control strategy of the engine based on the second operative shift configuration.

11. The method of claim 10, further comprising providing a signal indicative of the mismatch between the first operative shift configuration and the second operative shift configuration.

12. The method of claim 9, wherein in the operative shift configuration of the pedal shift lever a first gear is engaged through a counter-clockwise rotation of the pedal lever, while a second and subsequent gears are engaged through a clockwise rotation of the pedal lever, and wherein in the reverse operative shift configuration of the pedal shift lever the first gear is engaged through the clockwise rotation of the pedal lever, while the second and subsequent gears are engaged through the counter-clockwise rotation of the pedal lever.

13. The method of claim 9, wherein:
the first set of one or more sensors comprises a first sensor configured to detect the tension state and a second sensor configured to detect the compression state of the rod; and
step B) further comprises:
  determining that the rod is in the tension state when the first signal is sent by the first sensor; and
  determining that the rod is in the compression state when the first signal is sent by the second sensor.

14. The method of claim 9, wherein:
the first set of one or more sensors comprises a sensor configured to generate a signal indicative of a axial tension value to which the rod is subjected; and
step B) further comprises:
  determining that the rod is in the tension state when a value of the signal generated by the sensor is included in a first range of values; and
  determining that the rod is in the compression state when the value of the signal generated by the sensor is included in a second range of values.

15. The method of claim 9, wherein:
the second set of one or more sensors detect a direction of rotation of a selector drum of the gearbox during a first gear shifting starting from a neutral condition; and
step D) further comprises:
  determining that a first gear is engaged when the rotation of the selector drum is in a first direction and
  determining that a second gear is engaged when the rotation of the selector drum is in a second direction opposite to the first direction.

16. The method of claim 15, wherein:
in step E) the standard operative shift configuration is determined:
  when in step B) the tension state is determined and in step D) the first gear engaged is determined; or
  when in step B) the compression state is determined and in step D) the second gear engaged is determined;
and wherein the reverse operative shift configuration is determined:
  when in step B) the compression state is determined and in step D) the first gear engaged is determined; or
  when in step B) the tension state is determined and in step D) the second gear engaged is determined.

17. The method of claim 9, wherein step D) further comprises:
d1) acquiring the second signal indicative of a speed of the vehicle;

d2) acquiring a third signal indicative of a speed of an engine of the vehicle;
d3) acquiring a fourth signal indicative of a neutral condition of the gearbox;
d4) acquiring a fifth signal indicative of a condition of a clutch of the vehicle;
d5) determining, based on the fourth signal, whether the gearbox is in the neutral condition or not in the neutral condition;
d6) determining, based on the fifth signal, whether the clutch is in an engaged condition or in a disengaged condition, wherein, when in sub-step d5) it is determined that the gearbox is not in the neutral condition and in the sub-step d6) it is determined that the clutch is in the disengaged condition, then step D) further comprises:

d7) calculating a reference parameter based on:

$$M = K * (V/rpm)$$

wherein:
M is the reference parameter;
K is a constant depending on a vehicle transmission;
V is the speed of the vehicle;
rpm is a number of revolutions of a drive shaft of the engine of the vehicle;

d8) defining a series of reference intervals for the parameter, wherein each reference interval is indicative of a gear engaged;
d9) determining the gear engaged based on the reference interval into which the parameter falls; and
d10) determining a direction of the gear shifting based on a comparison between the gear engaged determined in the sub-step d9) and the gear engaged before the gear shifting.

18. The method of claim 17, wherein:

in step E) the standard operative shift configuration is determined when:
in step B) the tension state is determined and in step D) an upshifting direction is determined; or
in step B) the compression state is determined and in step D) a downshifting direction is determined;

and wherein the reverse operative shift configuration is determined when:
in step B) the tension state is determined and in step D) a downshifting direction is determined; or
in step B) the compression state is determined and in step D) an upshifting direction is determined.

* * * * *